United States Patent [19]

Hermanns et al.

[11] 4,022,515
[45] May 10, 1977

[54] SUPPORT MEANS FOR TEXTILE SPINDLES AND ROTORS HAVING ANTI-FRICTION BEARINGS

[75] Inventors: Hans Hermanns, Elfershausen; Manfred Kress, Grafenrheinfeld; Friedrich Schuster; Kurt Schwabe, both of Hammelburg, all of Germany

[73] Assignee: Kugelfischer Georg Schäfer & Co., Schweinfurt, Germany

[22] Filed: Dec. 2, 1975

[21] Appl. No.: 637,011

[52] U.S. Cl. .............................. 308/152; 308/228
[51] Int. Cl.² .................................. F16C 19/10
[58] Field of Search ............ 308/152, 228; 57/134, 57/135

[56] References Cited

UNITED STATES PATENTS

| | | | |
|---|---|---|---|
| 2,061,187 | 11/1936 | Colvin | 308/228 |
| 3,035,402 | 5/1962 | Westall et al. | 308/152 X |
| 3,438,191 | 4/1969 | Kuzentsov et al. | 308/152 X |
| 3,500,624 | 3/1970 | Polyakovsky et al. | 308/152 X |
| 3,920,291 | 11/1975 | Wendel et al. | 308/152 |

FOREIGN PATENTS OR APPLICATIONS 1,510,944  2/1966  Germany ................. 308/228UX Primary Examiner—Joseph F. Peters, Jr.
Assistant Examiner—Gene A. Church
Attorney, Agent, or Firm—Stevens, Davis, Miller & Mosher

[57] ABSTRACT

A rotatable member such as a spindle or rotor of a textile machine having longitudinally spaced anti-friction bearings is supported in a housing by elastic members such as rubber O-rings having a cross-section which provides for progressive dampening. The elastic member supporting the bearing which is subjected to the greatest load has a dampening effect of at least twice that of the other one. The increased dampening of the one elastic member over the other may be obtained by greater mass or softer material.

10 Claims, 5 Drawing Figures

SUPPORT MEANS FOR TEXTILE SPINDLES AND ROTORS HAVING ANTI-FRICTION BEARINGS

This invention relates generally to an improved means for supporting a rotatable shaft and anti-friction bearing and, more particularly, to a means for supporting a textile spindle or rotor having anti-friction bearings with individual elastic members in a housing.

Imbalance of the rotating parts of textile spindles and rotors which rotate at high speeds around their vertical axes causes increased radial loads in the bearings. Such loads substantially reduce the life of the bearings. In addition, the smoothness of operation and the noise of textile spindles and rotors, particularly in the case of spinning and twisting bobbins, are detrimentally affected by such imbalances.

In order to dampen the oscillations caused by imbalance of rapidly rotating parts, it has already been proposed to support the rotating parts in anti-friction bearings which are supported against the housing via elastic intermediate members (German Patent No. 545,120). There is also known a bearing support in which the elastic intermediate member which is arranged on the outer race of the bearing is formed by an O-ring (German Petty Patent No. 1,932,073). In accordance with another known proposal, the elastic intermediate member is located between a socket fastened to the bearing housing and a socket fastened to a frame (German Unexamined Application for Patent No. 1,560,292).

However, these known bearing supports are not entirely satisfactory for improving the life of the bearing or the smoothness in operation of the spindles and rotors. This is due in particular to the fact that these bearing supports are provided with elastic intermediate members which are not adapted either to the oscillation behavior of the spindles or rotors or to the bearing loads which occur.

An object of the present invention is to provide a simple support means for textile spindles or rotors and their anti-friction bearings whereby the aforementioned disadvantages are avoided and quiet operation of the spindles and rotors and long life of the bearings are assured.

Other objects wll become apparent from the following description with reference to the accompaying drawing wherein.

This result is achieved, generally speaking, in accordance with this invention by providing an assembly for supporting a rotatable shaft which has a load bearing end and an opposite end comprising first and second longitudinally spaced anti-friction bearings for the shaft, housing means enclosing each of the bearings and an elastic member which has a cross-section whereby its dampening effect is progressively increased as it is compressed under load between each bearing and the housing, the elastic member about the bearing nearest the load carrying end of the shaft being adapted to dampen the vibrations of a heavier load than the elastic member between the second bearing and housing.

The assembly may be characterized by having an elastic intermediate member arranged on the bearing having the higher load which has at least twice as great a dampening mass with a progressive-dampening cross-section of the two intermediate members and or a lesser hardness than the intermediate member arranged on the other bearing.

The elastic members between the housing and bearing are preferably elastomeric O-rings having a progressive dampening cross-section. Clamping sleeves may be provided about the elastic members. As compared with the known elastic bearing supports, the support in accordance with the invention assures both a quiet operation of the spindles or rotors and a longer life of the bearings, and does so with extremely simple means.

Figure 1:
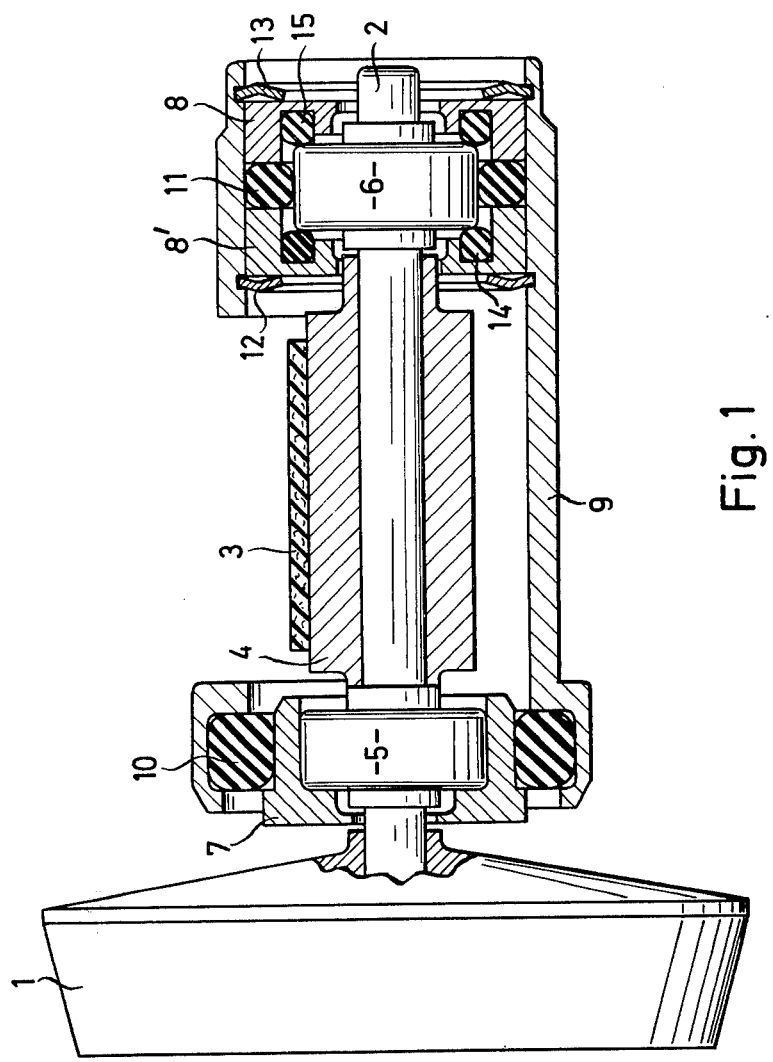
FIG. 1 is a partial sectional view of a spinning turbine in which the supporting is effected by means of O-rings.

Referring to FIG. 1 of the drawing, the rotor 1 of a spinning turbine is arranged on a rapidly rotating spindle 2 which is driven by a belt 3 via a drive sleeve 4. The spindle 2 is supported in two anti-friction bearings 5 and 6 each of which is surrounded by a clamping sleeve 7 and 8, 8' respectively. Between the clamping sleeves 7 and 8, 8' and a housing 9 which surrounds all the individual parts there are arranged under initial stress two elastic intermediate members 10 and 11 having a progressive-dampening cross-section, for instance O-rings, in such a manner that at the bearing 5 which is subject to a larger or heavier load, the mass of the elastic intermediate member 10 is at least twice as great as that of the elastic intermediate member 11 on the bearing 6 which is subjected to a smaller or lighter load. The axial fixing in space of the bearing 6 is effected by two spring discs 12 and 13 which secure the clamping sleeves 8 and 8' in the housing 9, O-rings 14 and 15 being furthermore provided for the axial dampening under initial stress between the ends of the bearing 6 and the clamping sleeves 8 and 8'.

Figure 2:
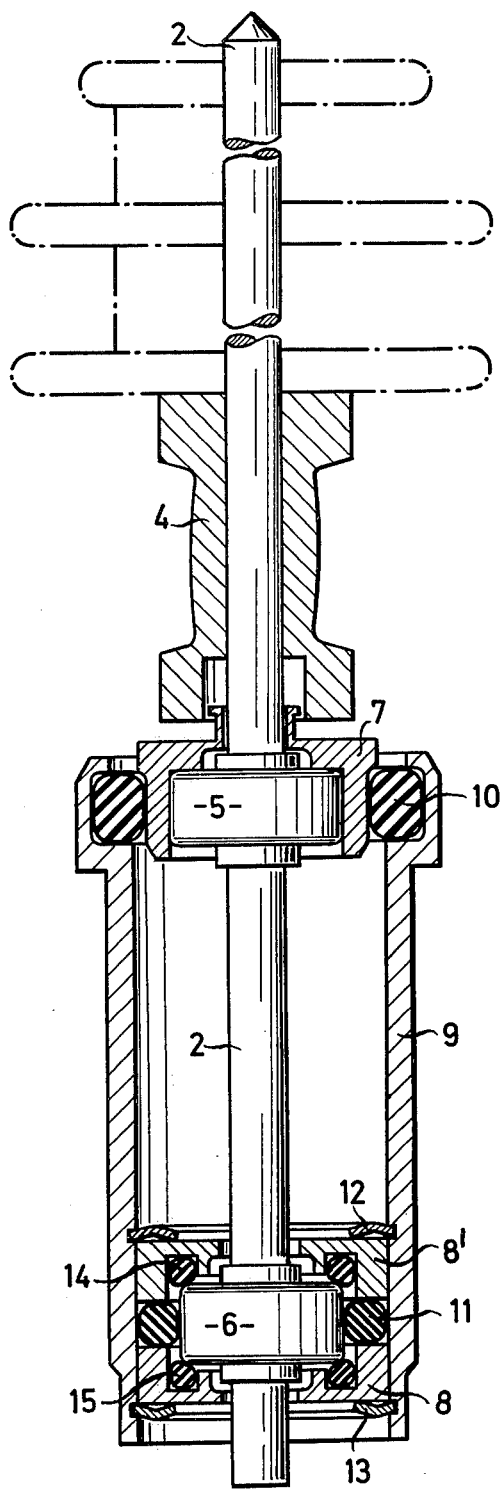
FIG. 2 is a partial sectional view of a textile spindle in which the supporting is effected by means of O-rings.

FIG. 2 shows a high speed spindle 2 which is driven via a drive sleeve 4. The spindle 2 is supported in two anti-friction bearings 5 and 6 each of which is surrounded by a clamping sleeve 7 and 8, 8' respectively. Between the clamping sleeves, 7 and 8, 8' and a housing 9 which surrounds all individual parts there are arranged under initial stress two elastic intermediate members 10 and 11 having a progressive-dampening cross-section, for instance O-rings, in such a manner that the mass of the elastic intermediate member 10 of the bearing 5 which is subjected to the higher load is twice as great as that of the elastic intemediate member 11 at the bearing 6 which is under less load. The bearing 6 is held axially by two spring discs 12 and 13 which secure the clamping sleeves 8, 8' in the housing 9, the O-rings 14 and 15 being furthermore provided for the axial dampening between the end sides of the bearing 6 and the clamping sleeves 8, 8'.

Figure 3:
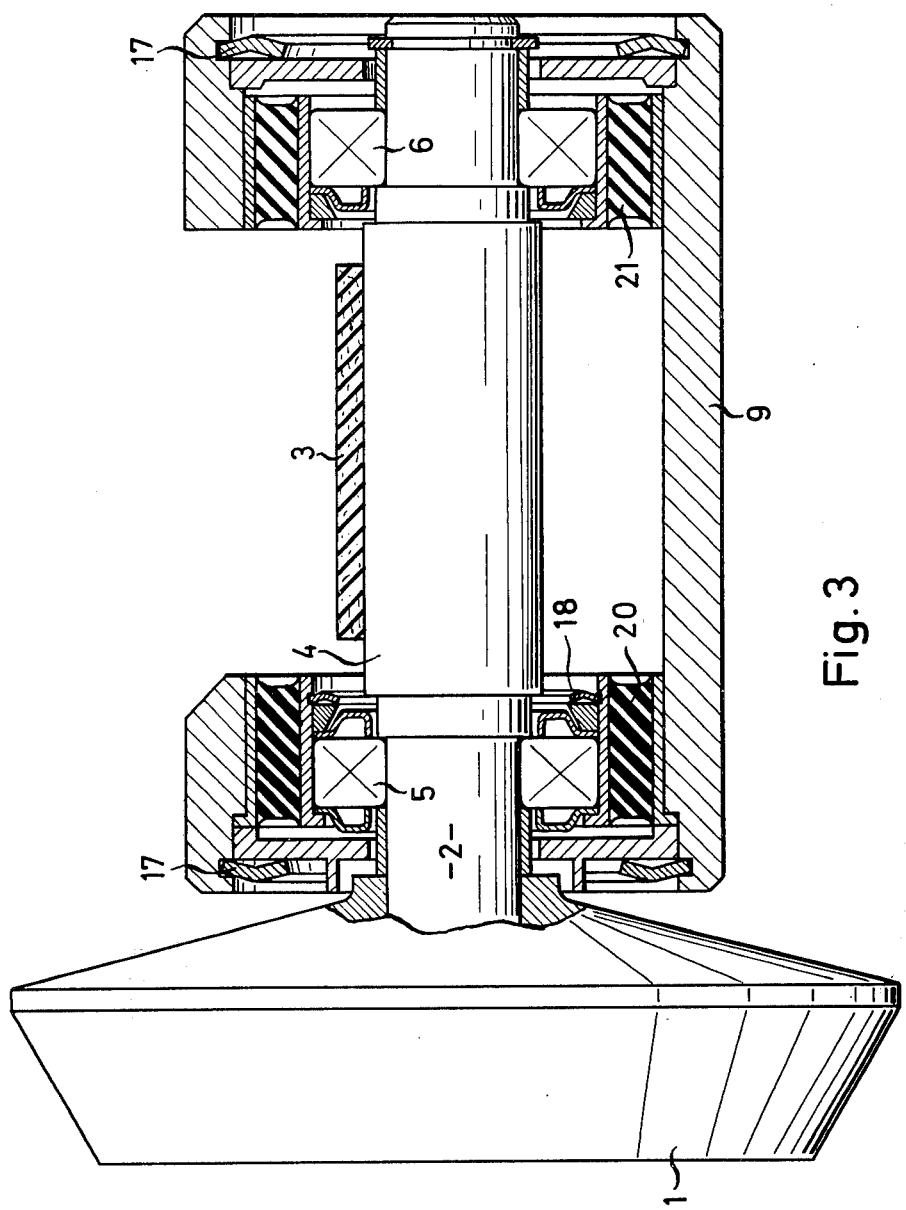
FIG. 3 is a partial sectional view of a spinning turbine in which the supporting is effected by means of elastic intermediate members of different hardnesses.

The embodiments of FIGS. 1 and 2 have the advantage that the O-rings used are inexpensive mass-produced articles. Referring to FIG. 3, the rotor 1 of a spinning turbine is arranged on a high speed spindle 2 which is driven via a drive sleeve 4 by a belt 3. The spindle 2 is supported in anti-friction bearings 5 and 6 each of which is supported in dampening fashion in a housing 9 by an annular elastic intermediate member 20 and 21, respectively, the said members being of different hardness. The axial fixing of the anti-friction bearing 5 and of the elastic intermediate member 20 in the housing 9 is effected by means of prestressed circlips 17 and 18. In this embodiment also the hardness of the elastic intermediate members (20, 21) can be adapted to the different bearing loads by a suitable selection of the material.

Figure 4:
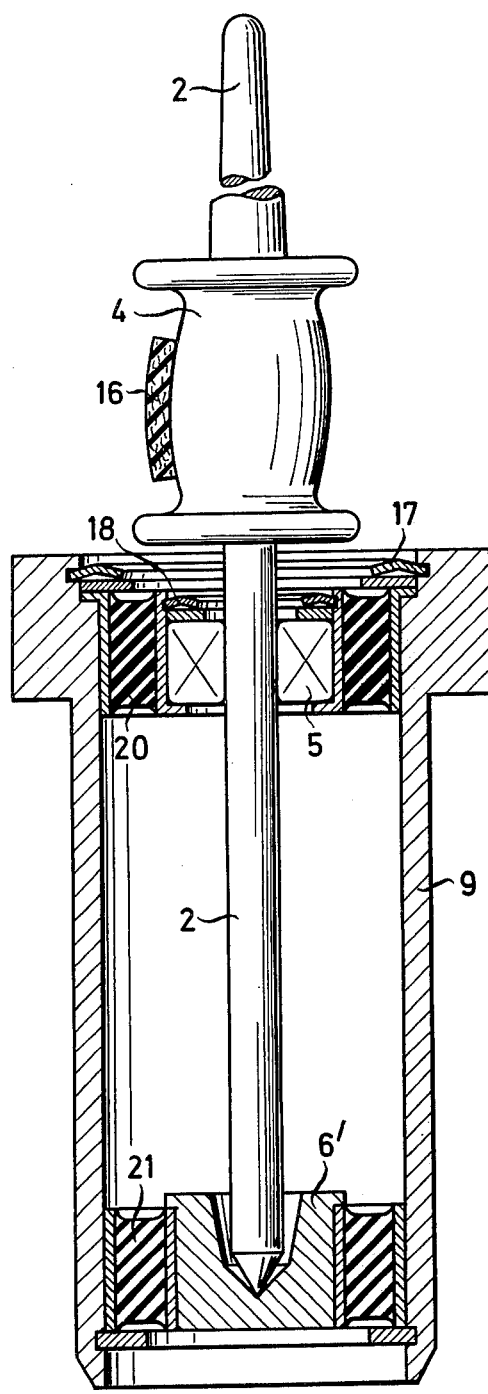
FIG. 4 is a partial sectional view of a textile spindle in which the supporting is effected by means of elastic intermediate members of different hardnesses.

FIG. 4 shows a high speed spindle 2 which is driven by a belt 16 via a whorl 4 and is supported in an anti-friction bearing 5 and a step bearing 6'. The anti-friction bearing 5 and the step bearing 6' are each supported and fastened in the housing by means of elastic intermediate members 20 and 21, respectively. The axial fixing of the anti-friction bearing 5 and of the intermediate member 20 is effected by prestressed circlips 17 and 18. The hardness of the elastic intermediate members 20 and 21 is adapted to the different loads of the bearings 5 and 6'.

Figure 5:
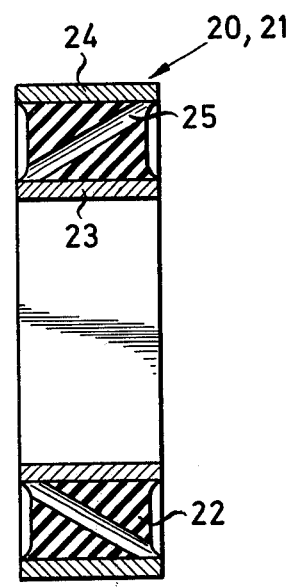
FIG. 5 is a section through an elastic intermediate member according to FIGS. 3 and 4, shown on a larger scale.

As can be noted from FIG. 5, the elastic intermediate members 20 and 21 of FIGS. 3 and 4 consist of a ring 22 of elastic material which is covered on the inside and outside by metal sleeves 23 and 24, respectively, the sleeves 23 and 24 being connected integrally with the ring 22 for instance by being vulcanized thereon. In order to avoid an accumulation of heat, axial bore holes or slits 25 can be provided in the ring 22 so as to assure a sufficient removal of the heat.

The hardness of the intermediate member associated with the anti-friction bearing subjected to higher loads may range from about 50° to about 80° Shore A, and the hardness range of the or each other intermediate member may extend from about 65° to about 90° Shore A.

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. An assembly comprising a rotatable shaft having a load carrying end and an opposite end, first and second longitudinally spaced anti-friction bearings supporting the shaft with the first bearing nearest the load carrying end and thereby supporting a heavier load than the second bearing, housing means about the bearings, and means for supporting the bearings in the housing means comprising an elastic member disposed between each of the bearings and the housing means, the elastic member disposed between the first bearing and the housing means being adapted to support a heavier load than the elastic member disposed between the second bearing and the housing means.

2. The assembly of claim 1 wherein the elastic member about each bearing is an O-ring and the O-ring about the first bearing is of larger mass than the O-ring about the second bearing.

3. The assembly of claim 1 wherein the elastic member about each bearing is an O-ring and the O-ring about the first bearing is softer than the O-ring about the second bearing.

4. The assembly of claim 1 wherein the said first and second elastic members have the same physical properties but the mass of the first is larger than the mass of the second.

5. The assembly of claim 1 wherein said bearings are disposed in clamping sleeves and said elastic members are rubber O-rings compressed between the clamping sleeves and the housing means.

6. The assembly of claim 5 wherein O-rings are provided between the top and bottom surfaces of the second bearing and the clamping sleeves.

7. The assembly of claim 4 wherein the mass of the first elastic member is at least twice as large as the mass of the second elastic member.

8. The assembly of claim 1 wherein the first and second elastic members have different hardnesses and the first elastic member is softer than the second elastic member.

9. The assembly of claim 1 wherein the first and second elastic members each have a progressive-dampening cross-section.

10. The assembly of claim 1 wherein said first and second elastic members are prestressed in different amounts.

* * * * *